United States Patent
Tabuchi et al.

(10) Patent No.: US 10,020,763 B2
(45) Date of Patent: Jul. 10, 2018

(54) POWER GENERATION SYSTEM

(71) Applicant: Mitsubishi Electric Corporation, Chiyoda-ku, Tokyo (JP)

(72) Inventors: Akiko Tabuchi, Tokyo (JP); Toshiyuki Fujii, Tokyo (JP); Ryota Onishi, Tokyo (JP); Shinya Noguchi, Tokyo (JP); Ryoji Miyatake, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1 day.

(21) Appl. No.: 15/501,540

(22) PCT Filed: Aug. 20, 2014

(86) PCT No.: PCT/JP2014/071736
§ 371 (c)(1),
(2) Date: Feb. 3, 2017

(87) PCT Pub. No.: WO2016/027321
PCT Pub. Date: Feb. 25, 2016

(65) Prior Publication Data
US 2017/0237373 A1 Aug. 17, 2017

(51) Int. Cl.
*H02P 9/10* (2006.01)
*H02P 9/14* (2006.01)
*H02P 9/08* (2006.01)
*H02P 9/00* (2006.01)
*H02P 9/30* (2006.01)

(52) U.S. Cl.
CPC ............... *H02P 9/08* (2013.01); *H02P 9/007* (2013.01); *H02P 9/302* (2013.01)

(58) Field of Classification Search
USPC .......................................................... 322/79
See application file for complete search history.

(56) References Cited

FOREIGN PATENT DOCUMENTS

| | | |
|---|---|---|
| JP | H04-096698 A | 3/1992 |
| JP | H07-245998 A | 9/1995 |
| JP | 08-066042 A | 3/1996 |
| JP | 2000-134939 A | 5/2000 |
| JP | 2009-189076 A | 8/2009 |
| JP | 2012-210084 A | 10/2012 |

(Continued)

OTHER PUBLICATIONS

International Search Report (PCT/ISA/210) dated Nov. 18, 2014, by the Japanese Patent Office as the International Searching Authority for International Application No. PCT/JP2014/071736.

(Continued)

*Primary Examiner* — Pedro J Cuevas
(74) *Attorney, Agent, or Firm* — Buchanan Ingersoll & Rooney PC (57) ABSTRACT

A power generation system is provided in which, when a static frequency converter (SFC) is connected to synchronous generator's armature windings, an AC exciter performs AC excitation by allowing a d-axis winding and a q-axis winding of the AC exciter to configure d-q orthogonal axes; and, at the time of steady-state operation of the synchronous generator, an alternating current(s) supplied from an electric power source is rectified by a thyristor excitation device, and also the AC exciter thereby performs DC excitation by connecting the d-axis winding and the q-axis winding in series with each other.

7 Claims, 8 Drawing Sheets (56) References Cited

FOREIGN PATENT DOCUMENTS

| | | |
|---|---|---|
| JP | 2013-236480 A | 11/2013 |
| JP | 2014-087086 A | 5/2014 |
| JP | 2014-093850 A | 5/2014 |

OTHER PUBLICATIONS

Written Opinion (PCT/ISA/237) dated Nov. 18, 2014, by the Japanese Patent Office as the International Searching Authority for International Application No. PCT/JP2014/071736.

Iiu Iiw ω Is Vt

POWER GENERATION SYSTEM

TECHNICAL FIELD

The present invention relates to a power generation system, and more particularly to a power generation system including an AC excited brushless excitation apparatus in which field windings of an AC exciter are multi-phase windings.

BACKGROUND ART

Generally, in a synchronous generator, a direct current is supplied to its rotor's field winding, and induced electromotive force generated in accordance with magnetic flux produced on the rotor side is outputted on a stator side. As representative methods for energizing the rotor's field winding, there are a thyristor excitation scheme and an AC brushless excitation scheme.

Between the schemes, the brushless excitation scheme is a method in which a rotary rectifier rectifies electric currents induced in armature windings of an AC exciter constituted of a field winding(s) on its stator side and, on its rotor side, the armature windings directly connected to a rotational shaft of a generator, and a rectified current is supplied to a field winding of the generator. In general, at the time of a generator's nominal operation, a voltage applied to the field winding(s) of the AC exciter is that of direct current.

As a start-up operation method of a synchronous generator, there is a method in which, using a static frequency converter (SFC: Static Frequency Converter; hereinafter, referred to as an "SFC," for brevity), the generator is accelerated by gradually raising a frequency of armature currents of the generator, namely, which is accelerated as an electric motor.

In the brushless excitation scheme, when a voltage applied to field windings of an AC exciter is a direct current and the field current thereof is maintained constant, a field current of a generator cannot be flowed during the halts of the generator, and the field current of the generator changes responding to a generator speed. For this reason, at the time of starting the generator, DC excitation is not applicable to an AC exciter.

When a start-up operation takes place using an SFC, there is a method in which, in order to use an AC exciter, a wound-rotor induction motor is used as the AC exciter (for example, refer to Patent Document 1).

When the number of revolutions of a generator is lower than or equal to a predetermined value, AC voltages are applied to field windings of the AC exciter; and, when the number is larger than a predetermined value, connections to the field windings of the AC exciter are modified, and, to the field windings thereof, a DC voltage is applied from a thyristor excitation device. In addition, there is a method in which, at the time of starting a generator, AC magnetic flux configured in a reverse direction to a stator side thereof is produced in three-phase windings of an AC exciter (for example, refer to Patent Document 2). Moreover, there is a method in which an SFC for use in a brushless exciter is provided to be used at low rotational speeds (for example, refer to Patent Document 3). The SFC for use in the brushless exciter applies electric currents of constant amplitudes to stator field windings of the exciter at such a frequency that a relative rotational speed of a rotating magnetic field viewed from the rotor is always maintained at a nominal rotational speed.

RELATED ART DOCUMENTS

Patent Documents

[Patent Document 1] Japanese Laid-Open Patent Publication No. H04-96698
[Patent Document 2] Japanese Laid-Open Patent Publication No. 2013-236480
[Patent Document 3] Japanese Laid-Open Patent Publication No. H07-245998

SUMMARY OF THE INVENTION

Problems to be Solved by the Invention

In such an AC brushless excitation apparatus and a power generation system, it is required to arrange that AC voltages are applied to multi-phase field windings of an AC exciter during a time period when a generator is started by an SFC, and that a DC voltage is applied to the multi-phase field windings of the AC exciter at the time of a nominal operation of the generator, thereby resulting in modifying connections to the field winding of the AC exciter between the AC excitation and the DC excitation. However, due to the modification of the connections, there arises a problem in that the unbalance is caused on a load in each of the field windings. Moreover, there arises a problem in that, in accordance with a change in the number of revolutions of a generator, characteristics of the outputs of the brushless excitation apparatus result in changes.

The present invention has been directed at solving such problems as described above, and an object of the invention is to provide a power generation system including a brushless excitation apparatus which can, when an AC exciter therein having multi-phase field windings also performs DC excitation, equally maintain a load in each of the field windings, and can control the outputs of the apparatus to be constant even when the number of revolutions of a generator changes.

Means for Solving the Problems

A power generation system according to the present invention comprises:
an electric power converter for outputting AC power, supplied from a first electric power source, as three-phase AC power of variable voltage or variable frequency;
a Scott transformer having three-phase windings on a primary side thereof, and a first single-phase winding and a second single-phase winding on a secondary side thereof, with the three-phase windings connected to output ends of the electric power converter, for outputting electric power of alternating currents having a phase difference to each other between the first single-phase winding and the second single-phase winding when three-phase AC electric power from the electric power converter is inputted into the three-phase windings;
a thyristor excitation device for rectifying an alternating current supplied from a second electric power source;
an AC exciter having a d-axis winding and a q-axis winding on a primary side thereof, and rotating-type multi-phase windings on a secondary side thereof;
an excitation scheme changeover device to which, on a primary side thereof, output lines of the thyristor excitation device, the first single-phase winding and the second single-phase winding are connected, and to which, on a secondary side thereof, the d-axis winding and the q-axis winding are connected, whereby the excitation scheme changeover device performs a changeover of excitation schemes by selecting either one of a first connection for connecting the d-axis winding to the first single-phase winding or the second single-phase winding and for connecting the d-axis winding to the other single-phase winding, or a second connection for connecting the d-axis winding and the q-axis winding in series with each other and for connecting the output lines of the thyristor excitation device to respective both ends of the d-axis and q-axis windings connected in series;

a rotary rectifier connected to the rotating-type multi-phase windings, for rectifying multi-phase outputs from the AC exciter;

a synchronous generator having a synchronous generator field winding and a synchronous generator armature winding, where the synchronous generator field winding is connected to output terminals of the rotary rectifier; and a static frequency converter driven to output its electric current of a frequency and a phase responding to a position of a rotor of the synchronous generator so as to flow through the synchronous generator armature winding, when the static frequency converter is connected to the synchronous generator armature winding, wherein, when the static frequency converter is connected to the synchronous generator armature winding, the AC exciter performs AC excitation by selecting the first connection by the excitation scheme changeover device so that the d-axis winding and the q-axis winding configure d-q orthogonal axes, and voltages of variable voltages or variable frequencies are applied to the d-axis winding and the q-axis winding; and, at the time of steady-state operation of the synchronous generator, the AC exciter performs DC excitation by rectifying an alternating current from the second electric power source by the thyristor excitation device, and also by selecting the second connection by the excitation scheme changeover device so as to connect the d-axis winding and the q-axis winding in series with each other.

In addition, another power generation system according to the present invention comprises:

an electric power converter having a first single-phase output and a second single-phase output, for outputting AC power, supplied from a first electric power source, as two groups of variable voltage or variable frequency electric power in single-phase alternating currents having a phase difference to each other;

a first single-phase transformer whose primary winding is connected to the first single-phase output;

a second single-phase transformer whose primary winding is connected to the second single-phase output;

a thyristor excitation device for rectifying an alternating current supplied from a second electric power source;

an AC exciter having a d-axis winding and a q-axis winding on a primary side thereof, and rotating-type multi-phase windings on a secondary side thereof;

an excitation scheme changeover device to which, on a primary side thereof, output lines of the thyristor excitation device, a secondary winding of the first single-phase transformer and a secondary winding of the second single-phase transformer are connected, and to which, on a secondary side thereof, the d-axis winding and the q-axis winding are connected, whereby the excitation scheme changeover device performs a changeover of excitation schemes by selecting either one of a first connection for connecting the d-axis winding to the secondary winding of the first single-phase transformer or the secondary winding of the second single-phase transformer and for connecting the q-axis winding to the other single-phase secondary winding, or a second connection for connecting the d-axis winding and the q-axis winding in series with each other and for connecting the output lines of the thyristor excitation device to respective both ends of the d-axis and q-axis windings connected in series;

a rotary rectifier connected to the rotating-type multi-phase windings, for rectifying multi-phase outputs from the AC exciter;

a synchronous generator having a synchronous generator field winding and a synchronous generator armature winding, where the synchronous generator field winding is connected to output terminals of the rotary rectifier; and a static frequency converter driven to output its electric current of a frequency and a phase responding to a position of a rotor of the synchronous generator so as to flow through the synchronous generator armature winding, when the static frequency converter is connected to the synchronous generator armature winding, wherein, when the static frequency converter is connected to the synchronous generator armature winding, the AC exciter performs AC excitation by selecting the first connection by the excitation scheme changeover device so that the d-axis winding and the q-axis winding configure d-q orthogonal axes, and voltages of variable voltages or variable frequencies are applied to the d-axis winding and the q-axis winding; and, at the time of steady-state operation of the synchronous generator, the AC exciter performs DC excitation by rectifying an alternating current from the second electric power source by the thyristor excitation device, and also by selecting the second connection by the excitation scheme changeover device so as to connect the d-axis winding and the q-axis winding in series with each other.

Effects of the Invention

According to the present invention, by achieving the inputs to the AC exciter as variable power sources thereto, it is made possible to curb variation of a generator field current in accordance with the increase of a generator's rotational speed at the time of its starting by an SFC, and to control the generator field current at a constant value.

EMBODIMENTS FOR CARRYING OUT THE INVENTION

Hereinafter, the explanation will be made in more detail referring to the drawings for the embodiments of a power generation system including an AC brushless excitation apparatus according to the present invention. It should be noted that the present invention is not necessarily limited to the embodiments as follows.

Embodiment 1

Figure 1:
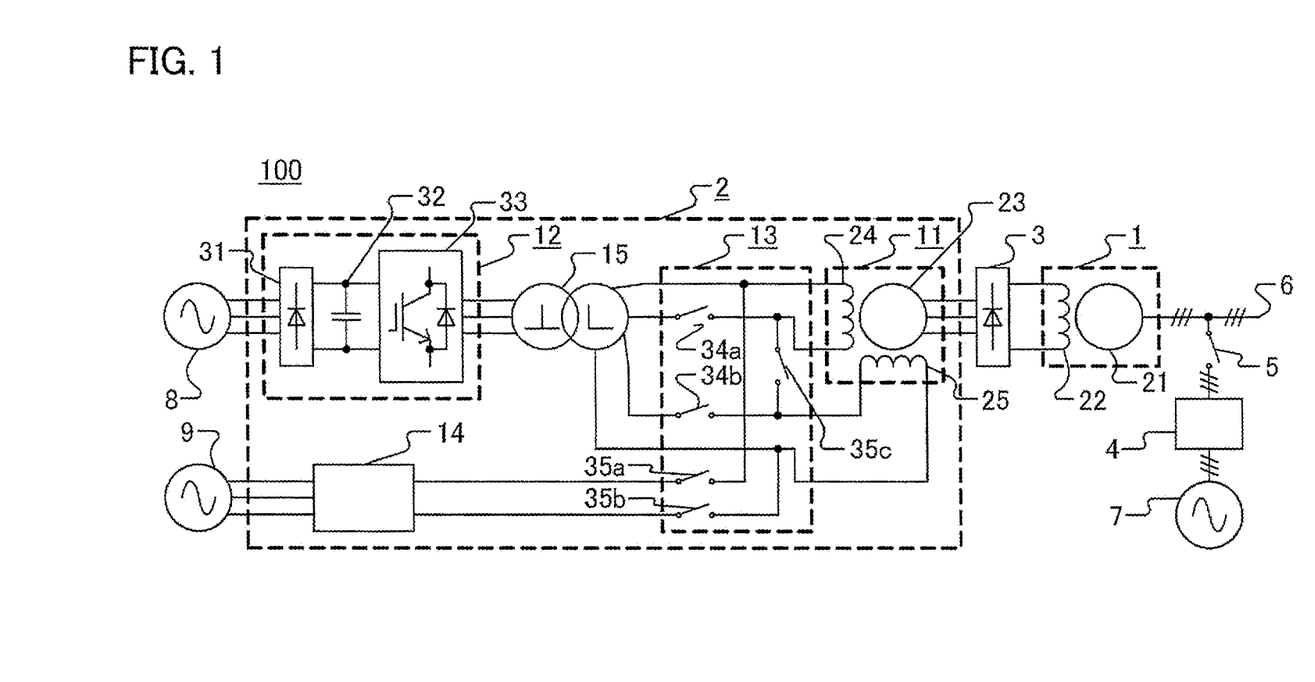
FIG. 1 is a diagram illustrating a configuration of an example of a power generation system including an AC brushless excitation apparatus according to Embodiment 1 of the present invention.

FIG. 1 is a diagram illustrating a configuration of an example of a power generation system including an AC brushless excitation apparatus according to Embodiment 1 of the present invention. A power generation system 100 includes a synchronous generator 1, an AC brushless excitation apparatus 2, a rotary rectifier 3 and a static frequency converter (SFC) 4. The synchronous generator 1 is of a field winding type, which includes synchronous generator-armature windings 21 and a synchronous generator field winding 22. AC outputs of the AC brushless excitation apparatus 2 are connected to the rotary rectifier 3, so that they are rectified by the rotary rectifier 3, and subsequently, the synchronous generator field winding 22 undergoes DC excitation. At the time of ordinary generation of electric power, generated electric power is transmitted by way of output lines 6 of the synchronous generator armature windings 21. A switchgear 5 is open-circuited at the time of ordinary generation of electric power. At the time of starting the synchronous generator 1, the SFC 4 to which electric power is supplied from an electric power source 7 is connected to the synchronous generator armature windings 21 by close-circuiting the switchgear 5, so that the synchronous generator is accelerated. Here, the electric power source 7 is equivalent to, for example, outputs of a transformer connected to a power-source system in a power station which are not shown in the figure. Output voltages of the transformer are voltages which are made compatible with inputs of the SFC 4.

The AC brushless excitation apparatus 2 includes an AC exciter 11, an electric power converter 12, an excitation scheme changeover device 13, a thyristor excitation device 14, and a Scott transformer 15 which is a transformer capable of obtaining two groups of single-phase alternating currents from three-phase alternating currents.

The AC exciter 11 is constituted of AC exciter armature windings 23, an AC exciter d-axis field winding 24 and an AC exciter q-axis field winding 25. Hereinbelow, the field windings may be collectively referred to as the AC exciter field windings 24 and 25. The AC exciter armature windings 23 constitute a rotor, and are directly connected to a rotational shaft of the synchronous generator 1. The AC exciter armature windings 23 are of three-phase windings, and are constituting AC outputs of the AC brushless excitation apparatus 2. The AC exciter field windings 24 and 25 constitute a stator. The stator of these windings is of a two-phase winding configuration, and is connected to the excitation scheme changeover device 13. Note that, even when the d-axis and the q-axis of the respective AC exciter field windings 24 and 25 described above are exchanged, a similar explanation is held.

The excitation scheme changeover device 13 is a device by which DC excitation and AC excitation of the AC exciter field windings 24 and 25 are changed over. When the DC excitation is performed, switchgears 34a and 34b are open-circuited, and switchgears 35a, 35b and 35c are close-circuited. At this time, the AC exciter field windings 24 and 25 are connected in series with each other. When the AC excitation is performed, the switchgears 34a and 34b are close-circuited, and the switchgears 35a, 35b and 35c are open-circuited. At this time, the AC exciter field windings 24 and 25 take to configure the d-q orthogonal axes of the AC exciter as described above. To an input portion of the excitation scheme changeover device 13, outputs of the thyristor excitation device 14 and outputs of the Scott transformer 15 are connected. When the DC excitation is performed, the outputs of the thyristor excitation device 14 are connected to the AC exciter field windings 24 and 25. When the AC excitation is performed, the outputs of the Scott transformer 15 are connected to the AC exciter field windings 24 and 25.

At the time of ordinary or steady-state operation of the synchronous generator 1, alternating currents supplied from an electric power source 9 are rectified by the thyristor excitation device 14, and the AC exciter 11 is thereby operated by means of DC excitation. Here, the electric power source 9 is supplied, for example, by means of a permanent-magnet generator not shown in the figure which is directly connected to a rotational shaft of the AC exciter 11. In addition, the electric power source can be supplied from a power-source system in a power station by way of a transformer not shown in the figure.

Next, the explanation will be made for a start-up operation time of the synchronous generator 1. An electric power source 8 supplies electric power to the electric power converter 12. The electric power source 8 is obtained, for example, from a power-source system in a power station by way of a transformer not shown in the figure. The electric power converter 12 is constituted of, for example, a diode rectifier 31, a smoothing capacitor 32 and a three-phase voltage-source inverter 33. The three-phase voltage-source inverter is constituted of, for example, IGBTs (Insulated Gate Bipolar Transistors) each of which is a self-extinction-type semiconductor switching device, and diodes each connected in antiparallel therewith. In addition, it is also clearly understood that, although not shown here, the inverter has a control device which generates gate signals of the IGBTs, and serves a protective function. The control device may also include a function further to perform transmission/reception of signals to/from detectors and other control means, not shown in the figure, inside of the power generation system 100. Moreover, it is needless to say that reactors may also be connected to the inputs and/or outputs of the diode rectifier 31.

AC power supplied from the electric power source 8 is rectified by the diode rectifier 31. Outputs of the electric power converter 12 are the outputs of the three-phase voltage-source inverter 33, and so three-phase alternating currents of variable voltages or a variable frequency are inputted into the Scott transformer 15.

The Scott transformer 15 being a transformer capable of obtaining two groups of single-phase alternating currents from three-phase alternating currents is specifically utilized as a means to obtain two-phase (d-q axes) alternating currents having a phase difference of 90° shifted to each other. By applying one output side of the Scott transformer 15 to the AC exciter d-axis field winding 24, and the other output side thereof to the AC exciter q-axis field winding 25, the AC exciter 11 is operated by d-axis and q-axis AC excitation. Note that, because the output voltages of the three-phase voltage-source inverter 33 are in the shape of rectangular waves, filters for removing high-frequency components may be provided on the input side or output side of the Scott transformer 15 for the purposes of preventing the application of surge voltages to the AC exciter field windings 24 and 25 by removing harmonic components, and of forming the voltages in the shape of sinusoidal waves.

Next, the explanation will be made for a mechanism in which output voltages are generated in the AC exciter armature windings 23 when the AC exciter 11 undergoes AC excitation. When the number of pole pairs of the AC exciter 11 is given as "p," and an exciting frequency applied to the AC exciter field windings 24 and 25, given as "f1" [Hz], a synchronous speed Ns [r/min] is expressed as Equation (1). A slip "s" can be expressed as Equation (2) when a rotational speed is given as N [r/min].

$$Ns=60\times f1/p \qquad (1)$$

$$s=(Ns-N)/Ns \qquad (2)$$

At the time of an operation halt, N=0, then the slip s=1; when a rotating magnetic field is excited in the same direction as a rotational direction, the slip s is to be decreased; and when the rotation is at a synchronous speed, N=Ns, then the slip s=0. When the rotating magnetic field is excited in a reverse direction to the rotational direction, the slip s is to be increased; and when the rotation is as N=−Ns, then the slip s=2. When a voltage of the AC exciter armature windings 23 each, namely, an input voltage of the rotary rectifier 3 is defined as E2 [V], and a voltage applied to the AC exciter field windings 24 and 25 each, as E1 [V], the E2 can be expressed as Equation (3).

$$E2=K1\times f1\times s\times E1 \qquad (3),$$

where the K1 is a constant value.

Furthermore, when the rotating magnetic field is excited in a reverse direction to the rotational direction (N≤0), a rotational frequency f2 [Hz] can be expressed as Equation (4); when the slip is expressed using the f1 and f2, Equation (5) is given as follows.

$$f2=-N\times p/60 \qquad (4)$$

$$s=(f1+f2)/f1 \qquad (5)$$

Note that, because the frequency of E2 is a slip frequency, Equation (6) can be thereby expressed.

$$s\times f1=f1+f2 \qquad (6)$$

According to Equation (3) and Equation (6), the E2 can be obtained by performing AC excitation (f1≠0) even at the time of an operation halt (s=1), so that alternating currents of the exciting frequency f1 [Hz] can be flowed into the inputs of the rotary rectifier 3. In addition, according to Equation (3), it is clearly understood that, if the E1 is constant, the E2 is proportional to the product of the exciting frequency f1 and the slip s. For this reason, when it is desired to obtain a predetermined E2 during the operation halts (s=1), the E1 can be made smaller if the f1 takes on larger. Moreover, when the rotating magnetic field is excited in the reverse direction to the rotational direction, the slip s becomes larger in accordance with the acceleration, so that, when the f1 is maintained to be constant, the E1 gets smaller.

Next, the explanation will be made for the operations of the power generation system 100 at the time of start-up operation. To the synchronous generator 1, torque is mechanically given by means of an external device not shown in the figure at an initial time of start-up operation; for example, the synchronous generator is rotating at a significantly low speed such as 3 r/min (3 min$^{-1}$). In order to apply a synchronous generator field voltage Vf to the synchronous generator field winding 22 so that a synchronous generator field current If required at the time of start-up operation flows through the field winding, the AC brushless excitation apparatus 2 outputs a voltage E2 of the AC exciter armature windings 23 each. When a required E2 is determined, a voltage E1 applied to the AC exciter field windings 24 and 25 each is determined according to Equation (3). The electric power converter 12 outputs voltages of the exciting frequency f1 and of the amplitude Vinv so that the voltage E1 having been determined can be obtained. From Equation (3), it is clearly understood that, when the f1 is made higher, the Vinv can be lowered. In accordance with the synchronous generator field current If which is increased, the SFC 4 detects or estimates a position of the rotor of synchronous generator, and outputs electric currents of a frequency and phases responding to the position, so that the currents are applied to the synchronous generator armature windings 21. According to this arrangement, the synchronous generator 1 gradually accelerates.

In general, when the synchronous generator 1 is rotating at a significantly low speed, the SFC 4 supplies its output currents thereto so that armature voltages of the synchronous generator 1 increase in proportion to an operating frequency thereof. Because of this, the operating frequency of the synchronous generator 1 rises, so that the synchronous generator 1 is accelerated. At this time, when an exciting frequency f1 is to be maintained constant, a synchronous generator field voltage Vf is regulated to be constant by reducing the Vinv as the acceleration goes on. On the other hand, the f1 may be reduced while the Vinv is maintained constant, or both of the f1 and Vinv are modified so that a synchronous generator field voltage Vf becomes constant. When the operating frequency of the synchronous generator 1 rises, and then reaches at an operation-mode changeover frequency fsg1, armature voltages are given as "Vsg1." The armature voltage Vsg1 of this case is below the rated or nominal values of armature voltages of the synchronous generator 1, and is, for example, the nominal output voltage of the SFC 4. From that time onward, in a region where the operating frequency exceeds the fsg1, the synchronous generator is operated under a condition in which the armature voltages are maintained constant. At this time, the Vf is reduced in accordance with the operating frequency in order to maintain the armature voltages at constant quantities of the Vsg1, so that the Vinv and f1 can be further reduced as the acceleration goes on. Because the Vf and If are DC quantities, it is possible to presume that the Vf and If have a proportionality relation to each other in a steady-state operation, so that the above explanation has been made for determining the f1 and Vinv by focusing on the Vf; however, the If may be focused on. In addition, the operating frequency is here defined as a criterion to change over the Vf from a constant value to a variable value; however, it is needless to say that the armature voltages may also be defined as the criterion, or a signal given from another control means in the power generation system 100 may also be defined as that.

According to the above, because the electric power converter 12 can output variable voltages or variable frequencies, obtained through the Scott transformer 15 are outputs of two-phase variable voltages or variable frequencies having a phase difference of 90° being shifted to each other. The output voltages of the Scott transformer 15 are inputted into the excitation scheme changeover device 13, and the outputs therefrom are applied to the AC exciter field windings 24 and 25. Therefore, into the AC exciter field windings 24 and 25, it is possible to input variable voltages or variable frequencies having a phase difference of 90° being shifted to each other. When input voltages of the AC exciter field windings 24 and 25 are modified, AC outputs of the AC brushless excitation apparatus 2, being the inputs of the rotary rectifier 3, change; and thus, it is possible to control the Vf and the If at the values suitable for starting the synchronous generator 1 by means of the SFC 4 as described above. Note that, the explanation has been made here for the case that the SFC 4 is used for a start-up operation of the synchronous generator 1; however, it is clearly understood that, when the synchronous generator 1 is driven also by using the SFC 4 for the purpose (s) other than the start-up operation, the AC brushless excitation apparatus 2 can be utilized.

As described above, the power generation system 100 including the AC brushless excitation apparatus 2 according to this embodiment can perform AC excitation on the AC exciter 11 at the time of starting the synchronous generator 1, and can perform DC excitation thereon at the time of steady-state operation thereof, by providing the AC exciter d-axis field winding 24, the AC exciter q-axis field winding 25 and the excitation scheme changeover device 13. In addition, when the DC excitation is performed, a direct current is flowed by connecting the AC exciter d-axis field winding 24 and the AC exciter q-axis field winding 25 in series with each other, so that electric currents flowing through the AC exciter field windings 24 and 25 are equal to each other, resulting in achieving effects that losses caused by both windings are balanced, and changes thereof in temperature are equally maintained.

Because the power generation system 100 having the AC brushless excitation apparatus 2 according to this embodiment includes the electric power converter 12, AC excitation of variable voltages or variable-frequency voltages can be performed on the AC exciter field windings 24 and 25 of the AC exciter 11. For this reason, the controllability of the synchronous generator field voltage Vf and the synchronous generator field current If is good at the time of starting the synchronous generator.

In addition, because the electric power converter 12 can output variable-frequency voltages, the AC exciter field windings 24 and 25 of the AC exciter 11 can be energized at a frequency higher than a commercial frequency. For this reason, a significant effect not attained hitherto is obtained such that the reduction of an excitation capacity can be achieved at the time of low speed operation. As a result, the capacity of the electric power converter 12 can also be reduced, so that it is possible to achieve more compact size with low costs.

Moreover, because the thyristor excitation device 14 uses alternating currents only at the time of steady-state operation for performing the DC excitation, a thyristor excitation device having conventionally the same specifications is applicable.

Embodiment 2

Figure 2:
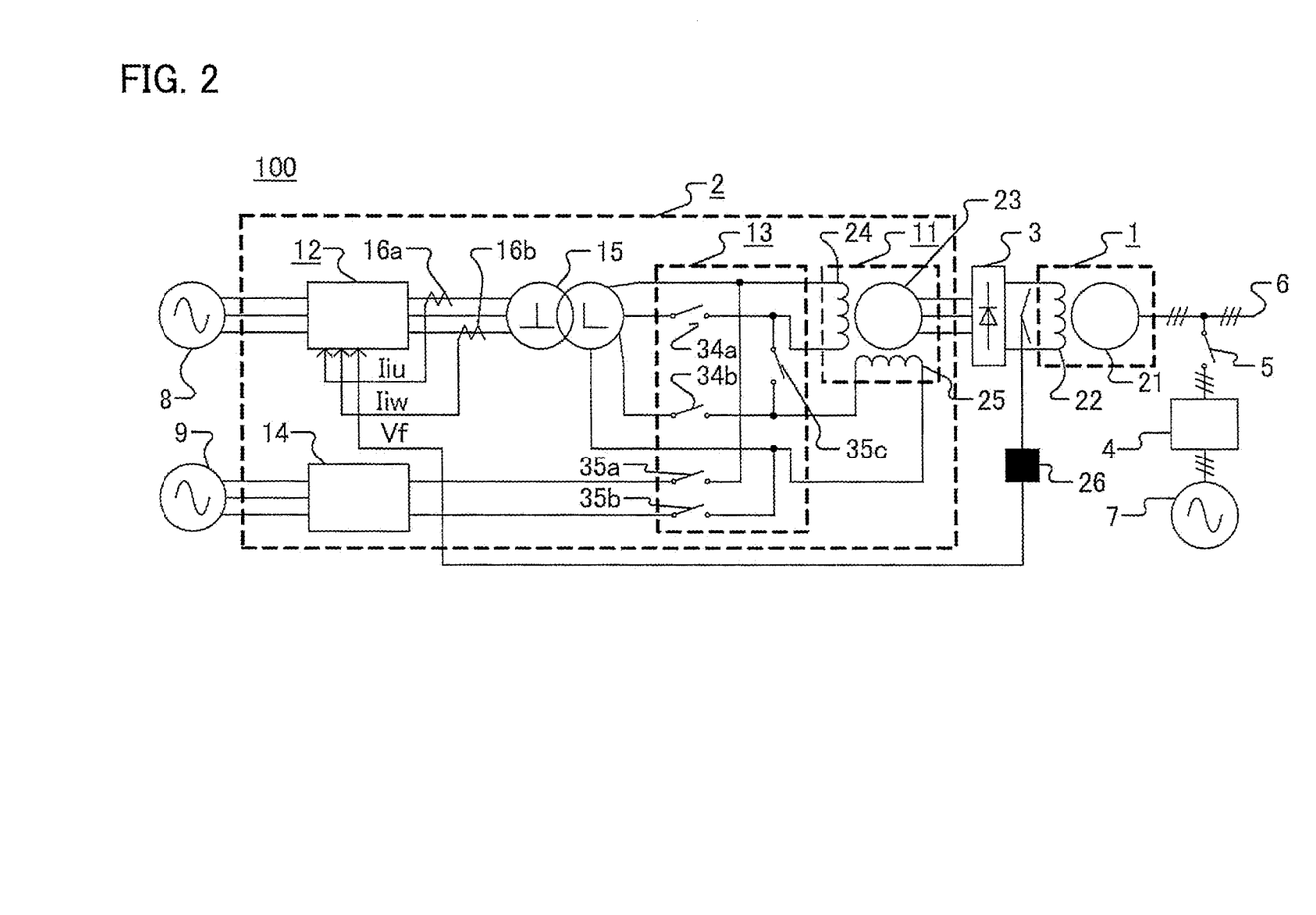
FIG. 2 is a diagram illustrating a configuration of a power generation system including an AC brushless excitation apparatus according to Embodiment 2 of the present invention.

FIG. 2 is a diagram illustrating a configuration of a power generation system including an AC brushless excitation apparatus according to Embodiment 2 of the present invention. Hereinafter, the same reference numerals and symbols designate the same or equivalent items or portions in Embodiment 1, and thus their explanation is omitted; here, only different items or portions thereto will be explained. The difference from the power generation system 100 including the AC brushless excitation apparatus 2 of FIG. 1 is a point in which the power generation system has a slip ring 26 and electric current detection-units 16a and 16b, so that detected values from those are inputted into the electric power converter 12.

In the power generation system 100 of FIG. 2, a synchronous generator field voltage Vf is detected by using the slip ring 26. According to this arrangement, a detected value of a voltage applied to the synchronous generator field winding 22 which is rotating can be inputted into the electric power converter 12 which is static. In the AC brushless excitation apparatus 2, the electric current detection-units 16a and 16b are further provided for detecting output currents Iiu and Iiw of the electric power converter 12. As for the remaining one phase of Iiv, it is so arranged that the Iiv is calculated by Equation (7) because the electric power converter 12 is of a three-phase three-wire system; however, it is needless to say that an electric current detection-unit may further be provided therefor.

$$Iiv=-Iiu-Iiw \quad (7)$$

Figure 3:
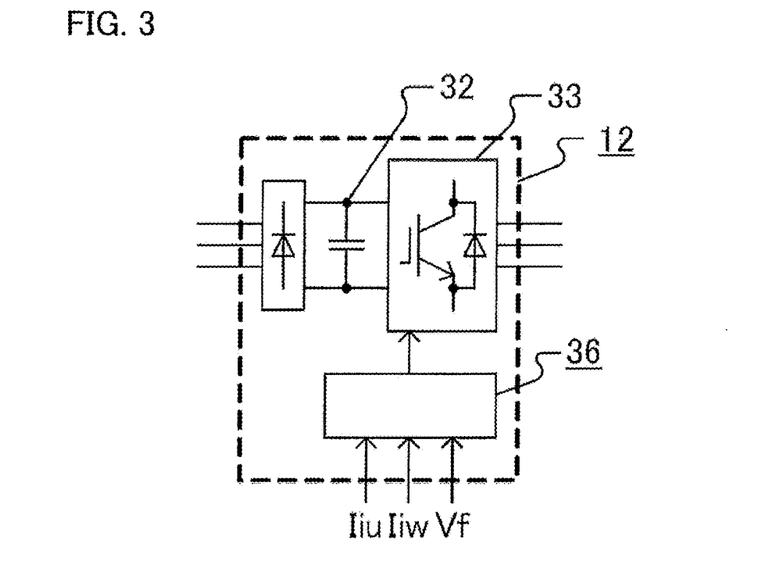
FIG. 3 is a diagram illustrating a configuration of an electric power converter of FIG. 2.

FIG. 3 is a diagram illustrating a configuration of the electric power converter 12 of FIG. 2. The electric power converter 12 of FIG. 3 includes an inverter control device 36. Values of Vf, Iiu and Iiw being detected ones are inputted into the inverter control device 36, which outputs gate signals of the three-phase voltage-source inverter 33.

Figure 4:
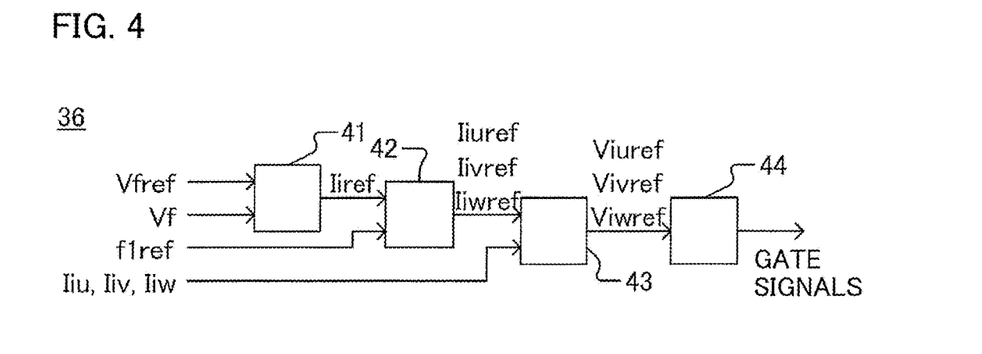
FIG. 4 is a block diagram illustrating an inverter control device of FIG. 3.

In what follows, the explanation will be made for a configuration of the inverter control device 36. FIG. 4 is a block diagram illustrating the inverter control device 36 of FIG. 3.

Figure 5:
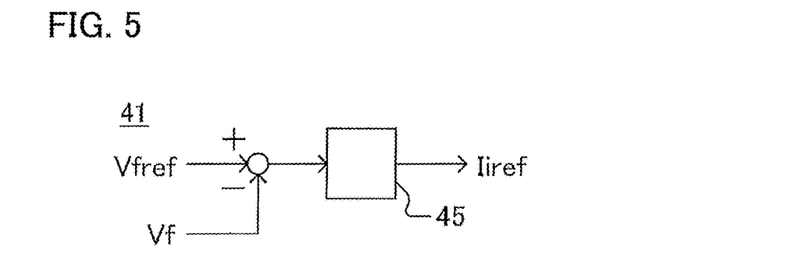
FIG. 5 is a block diagram illustrating a generator field-voltage control unit of FIG. 4.

Asynchronous generator field-voltage instruction-value Vfref is, for example, internally held as a fixed value in the inverter control device 36. On the other hand therefor, there is also a case in which a value responding to constants of the synchronous generator 1 and a state of ambient temperature or the like is received from other control means not shown in the figures. At the time of a field-voltage constant control, the field-voltage instruction-value Vfref takes on a constant value; however, because the circuitry is inductive, it is suitable to arrange that, in order to prevent overcurrents, the Vfref is gradually increased after a halt state of the three-phase voltage-source inverter 33 being released, from the state where its output currents are "0," at an early stage where its voltages are outputted. A synchronous generator field-voltage instruction-value Vfref and a synchronous generator field voltage Vf are inputted into a synchronous generator field-voltage control unit 41. FIG. 5 is a block diagram illustrating the synchronous generator field-voltage control unit 41 of FIG. 4. The synchronous generator field-voltage control unit 41 performs a feedback control, and outputs an inverter-current amplitude instruction-value Iiref.

A synchronous generator field-voltage controller 45 is a proportional and integral controller, for example.

Because the instruction-value Iiref is derived as the electric current amplitude, an instantaneous value for each of the phases of the inverter is generated by an inverter-current instruction-value generation unit 42. Into the inverter-current instruction-value generation unit 42, an inverter-frequency instruction-value f1ref is further inputted. By using the instruction-values Iiref and f1ref, inverter-current instruction-values Iiuref, Iivref and Iiwref are generated as expressed by Equation (8) through Equation (10).

$$Iiuref = Iiref \times \sin(360° \times f1ref \times t) \quad (8)$$

$$Iivref = Iiref \times \sin(360° \times f1ref \times t - 120°) \quad (9)$$

$$Iiwref = Iiref \times \sin(360° \times f1ref \times t + 120°) \quad (10)$$

Here, parameter "t" denotes time, which is not necessarily required to be synchronized with that of the SFC 4 or the like, but may be internally generated. In relation also to the phases, it is not required to determine such as Equation (8) through Equation (10); it is only necessary that the inverter-current instruction-values are three-phase balanced. The inverter-frequency instruction-value f1ref may be internally held as a fixed value, or may be modified in accordance with a system state such as a rotational speed or the like. In relation also to the sinusoidal calculation, a consecutive operation may also be performed, or the acquisition may be achieved by referring to a table.

Figure 6:
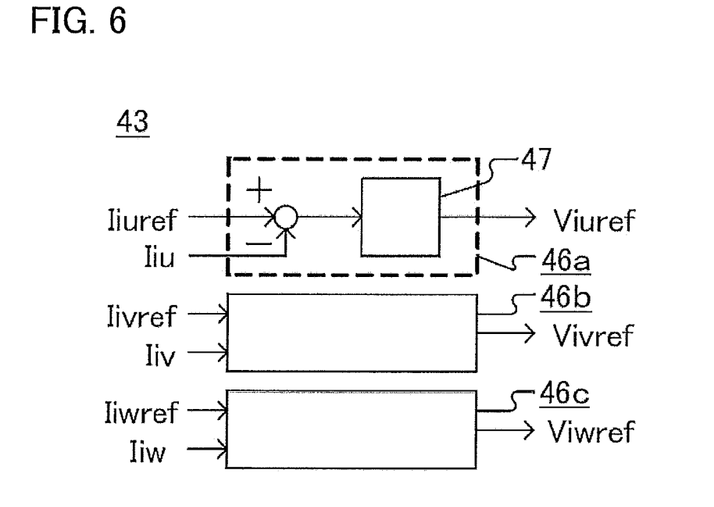
FIG. 6 is a block diagram illustrating an inverter-current control unit of FIG. 4.

The inverter-current instruction-values Iiuref, Iivref and Iiwref, and output currents Iiu, Iiv and Iiw are inputted into an inverter-current control unit 43. FIG. 6 is a block diagram illustrating the inverter-current control unit 43 of FIG. 4. The inverter-current control unit 43 performs a feedback control, and outputs inverter-voltage instruction-values Viuref, Vivref and Viwref. Because phase-current control units 46a, 46b and 46c each have the same configuration, the phase-U phase-current control unit 46a is given as a representative example, and so the explanation will be made for the phase-U phase-current control unit. The "Iiuref" and "Iiu" are inputted into the phase-current control unit 46a, which performs a feedback control, and outputs a Viuref. An inverter-current controller 47 can be achieved by a proportional and integral controller, or a proportional controller.

The inverter-voltage instruction-values Viuref, Vivref and Viwref are inputted into a gate-signal generation unit 44, which outputs gate signals of IGBTs of the three-phase voltage-source inverter 33. The gate-signal generation unit 44 generates gate signals so that output phase-voltages of the three-phase voltage-source inverter 33 become equivalent to the inverter-voltage instruction-values Viuref, Vivref and Viwref. For example, after having zero-phase-sequence voltages superimposed on in order to enhance a voltage utilization factor, the normalization is performed by a voltage across both ends of the smoothing capacitor 32, and the comparison is made with a triangular carrier.

Note that, it has been shown here by way of an example in which the three-phase current instruction-values are generated by the inverter-current instruction-value generation unit 42, and the current control is individually performed on the three phases in the inverter-current control unit 43; however, it may also be adopted that, after having generated current instruction-values on the d-q axes and performed the current control on the d-q axes, inverter-voltage instruction-values Viuref, Vivref and Viwref are acquired by transforming the values from the d-q axes into those on the three phases.

In addition, from the detected values, noise and the high-frequency components not required for the control may be removed by providing low-pass filters by means of hardware or software.

As described above, in the power generation system 100 including the AC brushless excitation apparatus 2 according to Embodiment 2, the synchronous generator field voltage Vf is detected by the slip ring 26, and the output currents Iiu and Iiw of the electric power converter 12 are detected by providing the electric current detection-units 16a and 16b, so that these values are inputted into the inverter control device 36 of the electric power converter 12; and thus, in addition to the effects of the power generation system 100 including the AC brushless excitation apparatus 2 according to Embodiment 1, the synchronous generator field voltage Vf can be controlled to be constant even when the slip of the AC exciter 11 changes in accordance with the acceleration of the synchronous generator 1.

Therefore, even when the synchronous generator 1 is excited using the AC exciter 11, the synchronous generator field current If can be maintained constant by maintaining the synchronous generator field voltage Vf constant during a time period when the SFC 4 supplies its output currents to the synchronous generator 1 so that the armature voltages thereof increase in proportion to an operating frequency thereof, and thus the synchronous generator 1 can be accelerated in a good condition.

Furthermore, while controlling the synchronous generator field voltage Vf to be constant, it is also made possible to regulate an excitation capacity by modifying an exciting frequency f1 of the AC exciter 11 in accordance with the acceleration of the synchronous generator 1.

Embodiment 3

Figure 7:
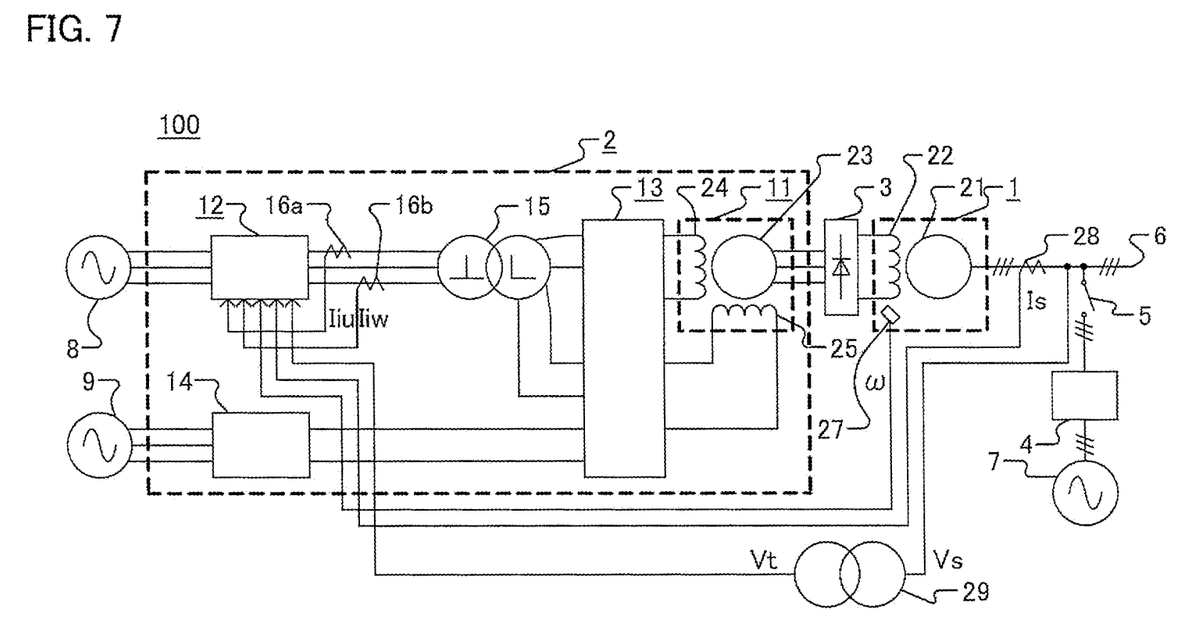
FIG. 7 is a diagram illustrating a configuration of a power generation system including an AC brushless excitation apparatus according to Embodiment 3 of the present invention.

FIG. 7 is a diagram illustrating a configuration of a power generation system including an AC brushless excitation apparatus according to Embodiment 3 of the present invention. Hereinafter, the same reference numerals and symbols designate the same or equivalent items or portions in Embodiment 1 and Embodiment 2, and thus their explanation is omitted; here, only different items or portions thereto will be explained. The difference from the power generation system 100 including the AC brushless excitation apparatus 2 of FIG. 2 is that, in place of the slip ring 26, a speed detector 27, an electric current detector 28 and a voltage transformer 29 are included. The speed detector 27 detects a rotational angular velocity ω of the synchronous generator 1. The electric current detector 28 detects an armature current Is of the synchronous generator 1, and the voltage transformer 29, an armature voltage Vs thereof. A voltage on a low voltage side of the voltage transformer 29 is given here as "Vt." Note that, instead of providing the speed detector 27, it may also be adopted that a rotational angular velocity ω is acquired from the frequency of the armature voltage Vs or the armature current Is.

Figure 8:
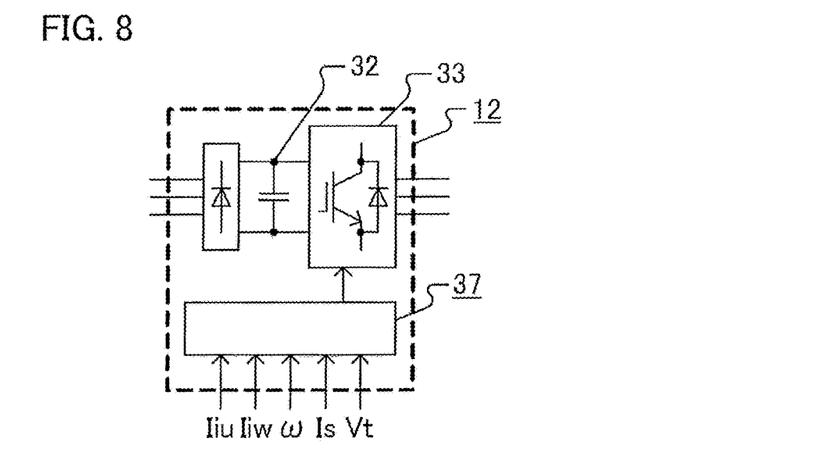
FIG. 8 is a diagram illustrating a configuration of an electric power converter of FIG. 7.

FIG. 8 is a diagram illustrating a configuration of the electric power converter 12 of FIG. 7. Differing from the electric power converter 12 of FIG. 3, the electric power converter 12 of FIG. 8 includes an inverter control device 37 in place of the inverter control device 36. Values of ω, Is, Vt, Iiu and Iiw being detected ones are inputted into the inverter control device 37, which outputs gate signals of the three-phase voltage-source inverter 33. Note that, as for the Is, the detection on two phases or the three phases is performed, so that three-phase currents of Isu, Isv and Isw are obtained.

Figure 9:
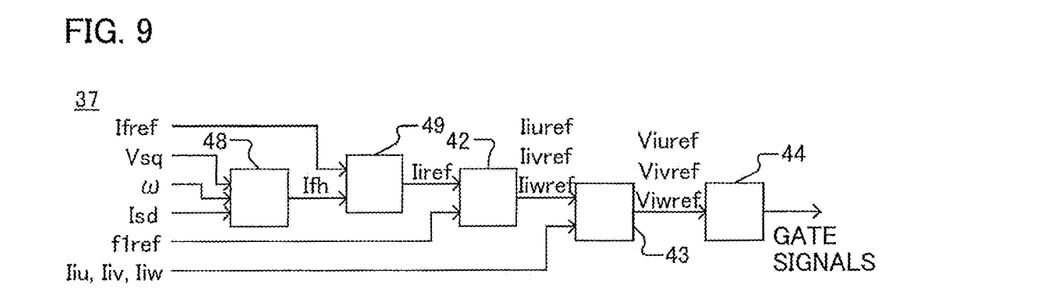
FIG. 9 is a block diagram illustrating an inverter control device of FIG. 8.

In what follows, the explanation will be made for a configuration of the inverter control device 37. FIG. 9 is a block diagram illustrating the inverter control device 37 of FIG. 8. The difference from the inverter control device 36 of FIG. 4 is that, in place of the synchronous generator field-voltage control unit 41, a synchronous generator field-current estimation unit 48 and a synchronous generator field-current control unit 49 are included. An output of the synchronous generator field-current control unit 49 is the inverter-current amplitude instruction-value Iiref, after which the following units are similar to those of the inverter control device 36; and thus their explanation is omitted.

Before explaining the details of the synchronous generator field-current estimation unit 48 and the synchronous generator field-current control unit 49, the explanation will be made for a d-axis and q-axis equivalent circuitry of the synchronous generator 1.

Figure 10:
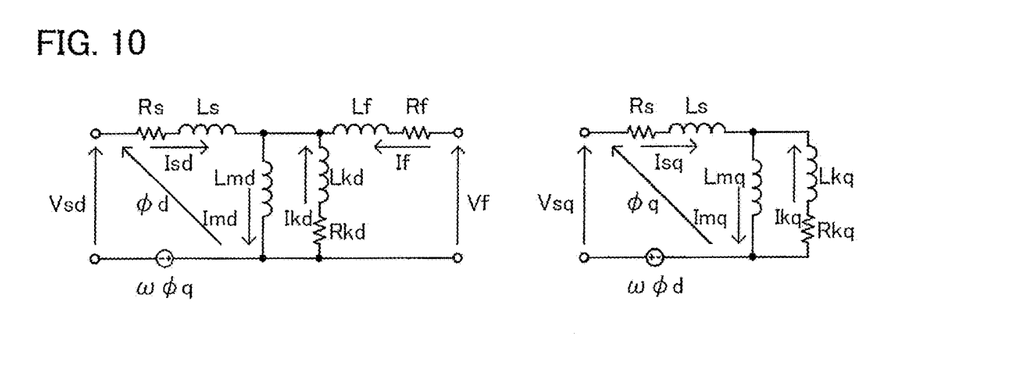
FIG. 10 is a diagram showing a d-axis and q-axis equivalent circuitry of a synchronous generator according to Embodiment 3 of the present invention.

FIG. 10 is a diagram showing the d-axis and q-axis equivalent circuitry of the synchronous generator 1 according to Embodiment 3 of the present invention. The synchronous generator field voltage Vf is taken on the d-axis. Here, Ls designates an armature leakage inductance; Rs, armature resistance; Lf, a field leakage inductance; Rf, field resistance; Lmd, a d-axis armature reaction inductance; Lmq, a q-axis armature reaction inductance; Lkd, a d-axis damper leakage inductance; Lkq, a q-axis damper leakage inductance; Rkd, d-axis damper resistance; Rkq, q-axis damper resistance; Vsd, a d-axis armature voltage; Vsq, a q-axis armature voltage; Vf, a synchronous generator field voltage; Isd, a d-axis armature current; Isq, a q-axis armature current; If, a synchronous generator field current; Imd, a d-axis exciting current; Imq, a q-axis exciting current; Ikd, a d-axis damper current; Ikq, a q-axis damper current; φd, magnetic flux produced on the d-axis; φq, magnetic flux produced on the q-axis; and ω, a rotational angular velocity. According to the d-axis equivalent circuit, the Imd can be expressed by Equation (11) from the If, Ikd and Isd; and magnetic flux φd produced on the d-axis, by Equation (12).

$$Imd = If + Ikd + Isd \quad (11)$$

$$\phi d = Isd \times Ls + Imd \times Lmd \quad (12)$$

Assuming now that the synchronous generator 1 is in a no-load state, an armature voltage Vs is totally given as a q-axis component on the d-q axes (Vsd=0, Vsq=Vs), so that an armature current Is can be determined as zero (Isd=0, Isq=0). At this time, Equation (12) can be expressed by Equation (13), and, from the q-axis equivalent circuit, Equation (14) is held.

$$\phi d = Imd \times Lmd \quad (13)$$

$$Vsq = \phi d \times \omega \quad (14)$$

Moreover, according to the d-axis equivalent circuit, the relationship between the If and the Imd can be expressed as Equation (15) by using a transfer function.

$$If = [\{s(Lmd+Lkd)+Rkd\}/(sLkd+Rkd)] \times Imd \quad (15)$$

By the way, when the synchronous generator 1 is accelerated, it is no more possible to presume that Is=0. At this time, the influence of armature reaction due to the Isd is caused, so that, by assuming that Ikd=0, the If can be expressed as Equation (16) by using Equation (11).

$$If = Imd - Isd \quad (16)$$

Embodiment 3 is an embodiment in which the synchronous generator field current If is controlled to be constant without directly detecting a synchronous generator field voltage Vf and a synchronous generator field current If. For this reason, in the inverter control device 37, a synchronous generator field-current estimate value Ifh is in the first place acquired in the synchronous generator field-current estimation unit 48.

Figure 11:
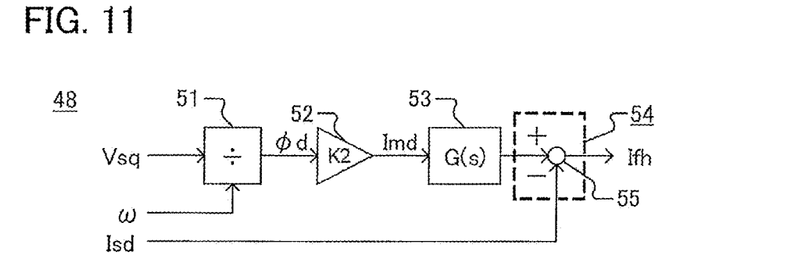
FIG. 11 is a block diagram illustrating a generator field-current estimation unit of FIG. 9.

FIG. 11 is a block diagram illustrating the synchronous generator field-current estimation unit 48 of FIG. 9. As for the "Vsq" which is one of the inputs, the Vsq is acquired from a voltage on a low voltage side of the voltage transformer 29 by presuming that Vsq=Vs. As for the "Isd," a value transformed from the three phases of Isu, Isv and Isw on the d-q axes is inputted. Because Equation (14) is held, the φd is acquired by dividing the Vsq by the ω using a divider 51.

Next, presuming that Equation (13) is held, the Imd is acquired by inputting the φd into an amplifier 52. The gain of the amplifier 52 is given as K2=1/Lmd. When the Imd is acquired, an If in a no-load state can be acquired from Equation (15). In the synchronous generator field-current estimation unit 48, the If is acquired by inputting the Imd into a phase compensator 53. The phase compensator 53 is expressed by Equation (17).

$$G(s) = \{s(Lmd+Lkd)+Rkd\}/(sLkd+Rkd) \quad (17)$$

Lastly, by inputting an output of the phase compensator 53 into an armature reaction compensator 54, it is possible to derive a synchronous generator field-current estimate value Ifh by taking armature reaction into consideration. Note that, the armature reaction compensator 54 is made of a subtracter 55 according to Equation (16).

Figure 12:
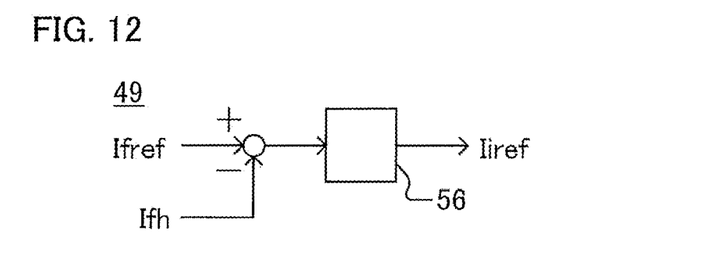
FIG. 12 is a block diagram illustrating a generator field-current control unit of FIG. 9.

FIG. 12 is a block diagram illustrating the synchronous generator field-current control unit 49 of FIG. 9. The synchronous generator field-current estimate value Ifh is inputted into the synchronous generator field-current control unit 49 together with a synchronous generator field-current instruction-value Ifref. The synchronous generator field-current control unit 49 performs a feedback control, and outputs an inverter-current amplitude instruction-value Iiref. A synchronous generator field-current controller 56 is a proportional and integral controller, for example. The field-current instruction-value Ifref is, for example, internally held as a fixed value in the inverter control device 37. On the other hand therefor, there is also a case in which a value responding to constants of the synchronous generator 1 and a state of ambient temperature or the like is received from other control means not shown in the figures. The field-current instruction-value Ifref is set at a constant value during a time period when the armature voltages of the synchronous generator increase in proportion to an operating frequency thereof; however, it is so arranged that overvoltages are not caused on output voltages of the three-phase voltage-source inverter 33 by limiting or like doing the Ifref until the If is to be established while torque is mechanically given to the synchronous generator 1 by means of an external device not shown in the figures, and while the synchronous generator is rotating at a significantly low speed.

In addition, from the detected values, noise and the high-frequency components not required for the control may be removed by providing low-pass filters by means of hardware or software.

As described above, the power generation system 100 including the AC brushless excitation apparatus 2 according to Embodiment 3 can estimate a synchronous generator field current If by detecting the armature voltage Vs, the rotational angular velocity ω and the armature current Is, without detecting the synchronous generator field voltage Vf by the slip ring 26. For this reason, in addition to the effects of the power generation system 100 including the AC brushless excitation apparatus 2 according to Embodiment 1 or Embodiment 2, the synchronous generator field current If can be controlled to be constant even when the slip of the AC exciter 11 changes in accordance with the acceleration of the synchronous generator 1. Therefore, even when the synchronous generator 1 is excited using the AC exciter 11, the synchronous generator field current If can be maintained constant during a time period when the SFC 4 supplies its output currents to the synchronous generator 1 so that the armature voltages thereof increase in proportion to an operating frequency thereof, so that the synchronous generator 1 can be accelerated in a good condition.

Moreover, while controlling the synchronous generator field current If to be constant, it is also made possible to regulate an excitation capacity by modifying an exciting frequency f1 of the AC exciter 11 in accordance with the acceleration of the synchronous generator 1.

Furthermore, because the slip ring 26 is not required, it is further possible to achieve more compact size with low costs, and also to enhance maintainability.

Embodiment 4

Figure 13:
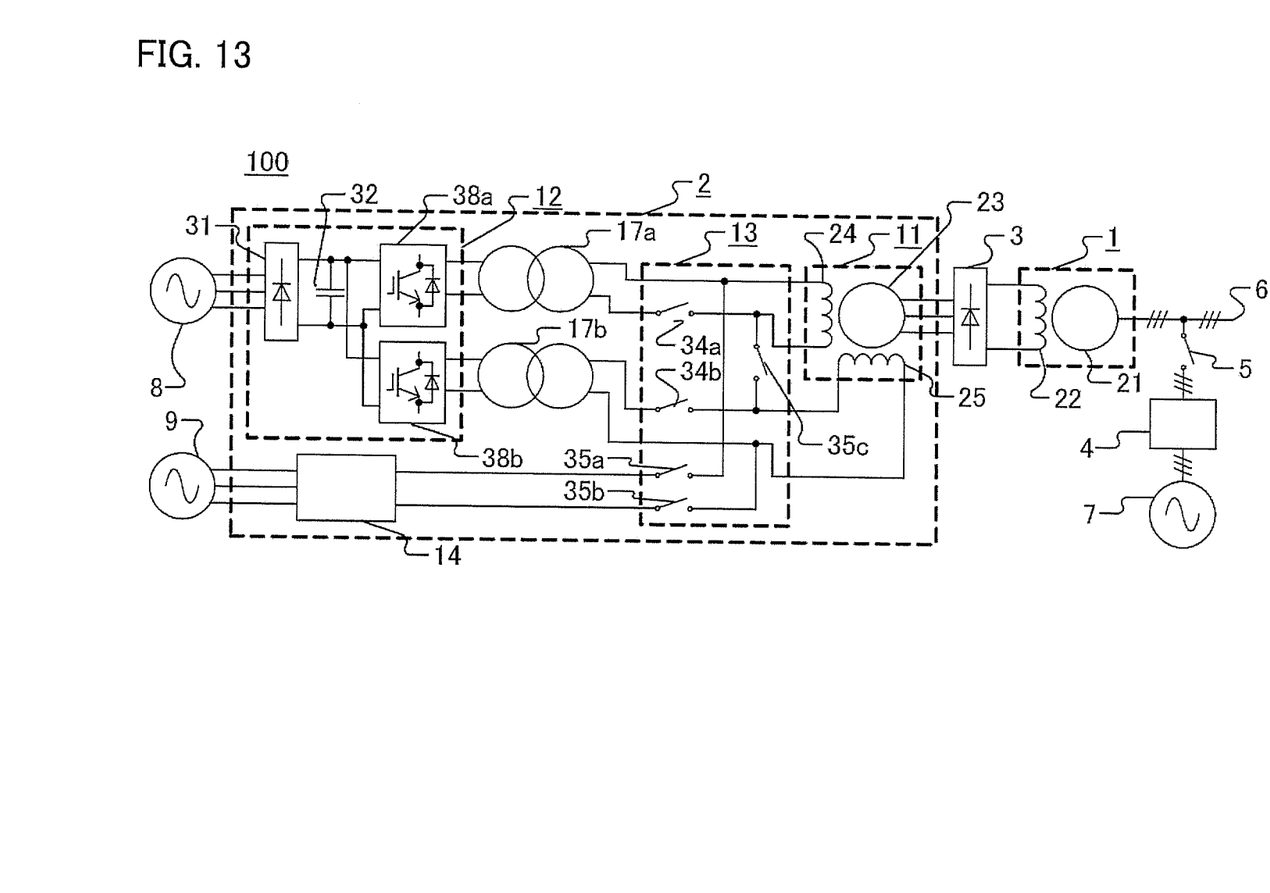
FIG. 13 is a diagram illustrating a configuration of a power generation system including an AC brushless excitation apparatus according to Embodiment 4 of the present invention.

FIG. 13 is a diagram illustrating a configuration of a power generation system including an AC brushless excitation apparatus according to Embodiment 4 of the present invention. Hereinafter, the same reference numerals and symbols designate the same or equivalent items or portions in Embodiment 1, Embodiment 2 and Embodiment 3, and thus their explanation is omitted; here, only different items or portions thereto will be explained. The difference from the power generation system 100 including the AC brushless excitation apparatus 2 of FIG. 2 is that the electric power converter 12 includes single-phase voltage-source inverters 38a and 38b in place of the three-phase voltage-source inverter 33, and includes single-phase transformers 17a and 17b in place of the Scott transformer 15.

In Embodiment 4, the secondary winding of the single-phase transformer 17a is to be connected to the AC exciter d-axis field winding 24, and the secondary winding of the single-phase transformer 17b is to be connected to the AC exciter q-axis field winding 25. To the primary winding of the single-phase transformer 17a, outputs of the single-phase voltage-source inverter 38a are connected, and, to the primary winding of the single-phase transformer 17b, outputs of the single-phase voltage-source inverter 38b. The single-phase voltage-source inverters 38a and 38b each output voltages so that the amplitude and frequency of their output currents are equal, but have their phase difference of 90° being shifted to each other. According to this arrangement, similarly to the AC excitation performed on the AC exciter field windings 24 and 25 by using the three-phase voltage-source inverter 33 and the Scott transformer 15, AC excitation can be performed on the AC exciter field windings 24 and 25 by using the single-phase voltage-source inverters 38a and 38b, and the single-phase transformers 17a and 17b.

Note that, because the output voltages of the single-phase voltage-source inverters 38a and 38b are in the shape of rectangular waves, filters for removing high-frequency components may be provided on the input sides or output sides of the single-phase transformers 17a and 17b for the purposes of preventing the application of surge voltages to the AC exciter field windings 24 and 25 by removing harmonic components, and of forming the voltages in the shape of sinusoidal waves.

In addition, the diode rectifier 31 and the smoothing capacitor 32 are made common here; however, they can be provided individually for the inverters. Moreover, the electric power can be supplied from a different electric power source (s); and, when the outputs of the single-phase voltage-source inverters 38a and 38b each are electrically isolated, it may be adopted that the single-phase transformers 17a and 17b are omitted.

As for the control of the single-phase voltage-source inverters 38a and 38b, it is suitable that, by handling the inverter-current instruction-value generation unit 42 and the inverter-current control unit 43 of the inverter control device 36 or 37 as on the d-q axes instead of the three-phase ones, gate signals of the single-phase voltage-source inverter 38a are generated from a voltage instruction-value on the d-axis in the gate-signal generation unit 44, and gate signals of the single-phase voltage-source inverter 38b, from a voltage instruction-value on the q-axis therein.

As described above, in the power generation system 100 including the AC brushless excitation apparatus 2 according to Embodiment 4, the electric power converter 12 includes the single-phase voltage-source inverters 38a and 38b in place of the three-phase voltage-source inverter 33, and includes the single-phase transformers 17a and 17b in place of the Scott transformer 15; and thus, in addition to the effects of the power generation system 100 including the AC brushless excitation apparatus 2 according to any one of Embodiment 1 through Embodiment 3, AC excitation can be performed on the AC exciter field windings 24 and 25, without using the Scott transformer 15, by using the single-phase transformers 17a and 17b whose structures are simple. Note that, in the present invention, each of the embodiments can be freely combined, and/or each of the embodiments can be appropriately modified or eliminated without departing from the scope of the invention.

EXPLANATION OF NUMERALS AND SYMBOLS

Numeral "1" designates a synchronous generator; "2," AC brushless excitation apparatus; "3," rotary rectifier; "4," static frequency converter (SFC); "5," switchgear; "6," output line of synchronous generator armature winding; "7," "8," "9," electric power source; "11," AC exciter; "12," electric power converter; "13," excitation scheme change-over device; "14," thyristor excitation device; "15," Scott transformer; "16a, 16b," "28," electric current detection-unit, electric current detector; "17a," "17b," single-phase transformer; "21," synchronous generator armature winding; "22," synchronous generator field winding; "23," AC exciter armature winding; "24," AC exciter d-axis field winding; "25," AC exciter q-axis field winding; "31," diode rectifier; "32," smoothing capacitor; "33," three-phase voltage-source inverter; "34a," "34b," "35a," "35b," "35c," switchgear; "36," "37," inverter control device; "38a," "38b," single-phase voltage-source inverter; and "100," power generation system.

What is claimed is:
1. A power generation system, comprising:
an electric power converter for outputting AC power, supplied from a first electric power source, as three-phase AC power of variable voltage or variable frequency;
a Scott transformer having three-phase windings on a primary side thereof, and a first single-phase winding and a second single-phase winding on a secondary side thereof, with the three-phase windings connected to output ends of the electric power converter, for outputting electric power of alternating currents having a phase difference to each other between the first single-phase winding and the second single-phase winding when three-phase AC electric power from the electric power converter is inputted into the three-phase windings;

a thyristor excitation device for rectifying an alternating current supplied from a second electric power source;

an AC exciter having a d-axis winding and a q-axis winding on a primary side thereof, and rotating-type multi-phase windings on a secondary side thereof;

an excitation scheme changeover device to which, on a primary side thereof, output lines of the thyristor excitation device, the first single-phase winding and the second single-phase winding are connected, and to which, on a secondary side thereof, the d-axis winding and the q-axis winding are connected, whereby the excitation scheme changeover device performs a changeover of excitation schemes by selecting either one of a first connection for connecting the d-axis winding to the first single-phase winding or the second single-phase winding and for connecting the d-axis winding to the other single-phase winding, or a second connection for connecting the d-axis winding and the q-axis winding in series with each other and for connecting the output lines of the thyristor excitation device to respective both ends of the d-axis and q-axis windings connected in series;

a rotary rectifier connected to the rotating-type multi-phase windings, for rectifying multi-phase outputs from the AC exciter;

a synchronous generator having a synchronous generator field winding and a synchronous generator armature winding, where the synchronous generator field winding is connected to output terminals of the rotary rectifier; and a static frequency converter driven to output its electric current of a frequency and a phase responding to a position of a rotor of the synchronous generator so as to flow through the synchronous generator armature winding, when the static frequency converter is connected to the synchronous generator armature winding, wherein, when the static frequency converter is connected to the synchronous generator armature winding, the AC exciter performs AC excitation by selecting the first connection by the excitation scheme changeover device so that the d-axis winding and the q-axis winding configure d-q orthogonal axes, and voltages of variable voltages or variable frequencies are applied to the d-axis winding and the q-axis winding; and, at a time of steady-state operation of the synchronous generator, the AC exciter performs DC excitation by rectifying an alternating current from the second electric power source by the thyristor excitation device, and also by selecting the second connection by the excitation scheme changeover device so as to connect the d-axis winding and the q-axis winding in series with each other.

2. The power generation system as set forth in claim 1, further comprising:

an electric current detection-unit for detecting an output current of the electric power converter, and for converting the output current thereof into a control signal, wherein the electric power converter includes an inverter-current control unit for comparing between an output current instruction-value instructed from the electric power converter and an output current of the electric power converter detected by the electric current detection-unit, and for outputting a drive pulse signal so that the output current instruction-value and the output current are equal to each other.

3. The power generation system as set forth in claim 1, further comprising:

a slip ring for detecting a field voltage of the synchronous generator; and an inverter control device for converting a voltage value of a detected field voltage of the synchronous generator into a control signal, wherein the electric power converter includes a synchronous generator field-voltage control unit for comparing between a detected field voltage of the synchronous generator and a field-voltage instruction-value instructed from the electric power converter, and for controlling an output current instruction-value of the electric power converter so that the field voltage and the field-voltage instruction-value are equal to each other.

4. The power generation system as set forth in claim 2, further comprising:

an electric current detector for detecting an armature current of the synchronous generator;

a voltage transformer for detecting an armature voltage of the synchronous generator; and yet further comprising:

a speed detector for detecting a rotational angular velocity of the synchronous generator; or a rotational angular-velocity acquisition unit for acquiring a rotational angular velocity of the synchronous generator from a frequency of either one of an armature voltage detected by the voltage transformer and an armature current detected by the electric current detector, wherein the electric power converter includes a field-current estimation unit for estimating a field current of the synchronous generator by using an armature voltage detected by the voltage transformer, a rotational angular velocity detected by the speed detector or that acquired by the rotational angular-velocity acquisition unit, and an armature current detected by the electric current detector, and for being capable of outputting an output current instruction-value of the electric power converter into the inverter-current control unit so that an estimate field current being estimated and an actual field current are equal to each other.

5. The power generation system as set forth in claim 4, wherein the electric power converter includes a field-current estimation unit for performing phase compensation on an armature voltage detected by the voltage transformer, on a rotational angular velocity thereof detected by the speed detector and on a d-axis exciting current thereof estimated from a d-axis exciting inductance thereof, by taking a transfer function of an internal configuration of the synchronous generator into consideration.

6. The power generation system as set forth in claim 4, wherein the electric power converter includes a field-current estimation unit for compensating an estimate value of a field current of the synchronous generator by using an armature current of the synchronous generator detected by the electric current detector.

7. A power generation system, comprising:

an electric power converter having a first single-phase output and a second single-phase output, for outputting AC power, supplied from a first electric power source, as two groups of variable voltage or variable frequency electric power in single-phase alternating currents having a phase difference to each other;

a first single-phase transformer whose primary winding is connected to the first single-phase output;

a second single-phase transformer whose primary winding is connected to the second single-phase output;

a thyristor excitation device for rectifying an alternating current supplied from a second electric power source;

an AC exciter having a d-axis winding and a q-axis winding on a primary side thereof, and rotating-type multi-phase windings on a secondary side thereof;

an excitation scheme changeover device to which, on a primary side thereof, output lines of the thyristor excitation device, a secondary winding of the first single-phase transformer and a secondary winding of the second single-phase transformer are connected, and to which, on a secondary side thereof, the d-axis winding and the q-axis winding are connected, whereby the excitation scheme changeover device performs a changeover of excitation schemes by selecting either one of a first connection for connecting the d-axis winding to the secondary winding of the first single-phase transformer or the secondary winding of the second single-phase transformer and for connecting the q-axis winding to the other single-phase secondary winding, or a second connection for connecting the d-axis winding and the q-axis winding in series with each other and for connecting the output lines of the thyristor excitation device to respective both ends of the d-axis and q-axis windings connected in series;

a rotary rectifier connected to the rotating-type multi-phase windings, for rectifying multi-phase outputs from the AC exciter;

a synchronous generator having a synchronous generator field winding and a synchronous generator armature winding, where the synchronous generator field winding is connected to output terminals of the rotary rectifier; and a static frequency converter driven to output its electric current of a frequency and a phase responding to a position of a rotor of the synchronous generator so as to flow through the synchronous generator armature winding, when the static frequency converter is connected to the synchronous generator armature winding, wherein, when the static frequency converter is connected to the synchronous generator armature winding, the AC exciter performs AC excitation by selecting the first connection by the excitation scheme changeover device so that the d-axis winding and the q-axis winding configure d-q orthogonal axes, and voltages of variable voltages or variable frequencies are applied to the d-axis winding and the q-axis winding; and, at a time of steady-state operation of the synchronous generator, the AC exciter performs DC excitation by rectifying an alternating current from the second electric power source by the thyristor excitation device, and also by selecting the second connection by the excitation scheme changeover device so as to connect the d-axis winding and the q-axis winding in series with each other.

* * * * *